United States Patent [19]
Nakayama et al.

[11] Patent Number: 5,637,179
[45] Date of Patent: Jun. 10, 1997

[54] PROCESS FOR ADHESION USING AN EPOXY RESIN ADHESIVE COMPOSITION

[75] Inventors: Akira Nakayama; Toshio Nagase, both of Kawasaki, Japan

[73] Assignee: Nippon Zeon Co., Ltd., Tokyo, Japan

[21] Appl. No.: 534,934

[22] Filed: Sep. 28, 1995

[30] Foreign Application Priority Data

Sep. 29, 1994 [JP] Japan ................... 6-259426

[51] Int. Cl.$^6$ .................. C09J 163/02; C09J 163/04
[52] U.S. Cl. .................. 156/330; 525/65
[58] Field of Search ............ 525/65; 156/330

[56] References Cited

U.S. PATENT DOCUMENTS

| | | | |
|---|---|---|---|
| 3,833,683 | 9/1974 | Dickie | 260/836 |
| 4,657,970 | 4/1987 | Shiraki et al. | 525/57 |
| 4,668,736 | 5/1987 | Robins et al. | 525/65 |
| 4,778,851 | 10/1988 | Henton et al. | 525/65 |
| 5,290,857 | 3/1994 | Nakayama et al. | 525/65 |

FOREIGN PATENT DOCUMENTS 62-104888   5/1962   Japan.

OTHER PUBLICATIONS

Derwent accession No. 94-347331/43 for Japanese Patent No. 6-271827, Nippon Zeon KK Sep. 27, 1994.
Abstract, No. 87-173887/23 (JP 62-104888), Derwent Publications Ltd.

Primary Examiner—Robert E. Sellers
Attorney, Agent, or Firm—Millen, White, Zelano & Branigan, P.C.

[57] ABSTRACT

A process for adhesion using an epoxy rein adhesive composition which comprises coating surfaces for adhesion with a two component epoxy resin adhesive composition prepared immediately before the coating by mixing a mixture containing (A) resin powder prepared by ionic crosslinking of resin particles by addition of a metal cation and (B) an epoxy resin with (C) a curing agent of a room temperature curing type for epoxy resins, bringing the coated surfaces for adhesion into contact with each other, and subsequently heating the surfaces for adhesion. The resin particle is constituted with (a) a core formed with a (meth)acrylate polymer and/or a diene polymer which has a glass transition temperature of −30° C. or lower and (b) a shell formed with a copolymer of a (meth)acrylate monomer and a radical polymerizable unsaturated carboxylic acid monomer having carboxyl group and 3 to 8 carbon atoms which has a glass transition temperature of 70° C. or higher. The adhesive composition used in the process can be cured by heating at a moderate temperature of 40° to 100° C., and a high tensile shear strength and T-peeling strength can be achieved.

13 Claims, No Drawings

PROCESS FOR ADHESION USING AN EPOXY RESIN ADHESIVE COMPOSITION

FIELD OF THE INVENTION

The present invention relates to a process for adhesion using an epoxy resin adhesive composition. More particularly, it relates to a process for adhesion using an epoxy resin adhesive composition which is advantageously used for adhesion of structural parts of buildings, furnitures, vehicles, and the like, can be easily applied without heating to a high temperature, and can achieve a high adhesive strength.

PRIOR ART OF THE INVENTION

Epoxy resins have various excellent properties, and were heretofore used for wide applications, such as adhesive materials for household handicrafts, constructions in civil engineering, buildings, other structural parts, and the like; coating materials for buildings, automobiles, cans, heavy duty corrosion prevention, and the like; materials for pavement; composite materials like carbon fiber reinforced plastics and the like; sealing materials for super LSI and LED in the field of electronics; and materials for casting and impregnation, and sealing material for powder coating used for electric instruments.

However, epoxy resins have a drawback in that adhesive strength and impact strength tend to be insufficient because internal stress tends to be present in cured products of epoxy resins. Various attempts have been made to improve this drawback. Examples of such attempt include modification of the structure of epoxy resins, for example, by incorporation of a spiro-ring structure into an epoxy resin, compounding with a filler, mixing with a rubbery material such as polybutadiene and nitrile rubber, addition of a reactive diluent, and incorporation of an aliphatic chain into an epoxy resin by a curing agent. However, the area to which such improvements can be applied is limited because the improvements frequently cause increase in cost and deterioration of physical properties such as heat resistance and stiffness.

A process for improving this drawback has been disclosed in Japanese Patent Application Laid-Open No. Heisei 6(1994)-172734. The process uses a composition comprising an uncured epoxy resin used as a medium, a core/shell copolymer in which a (meth)acrylate polymer having a solubility parameter close to the epoxy resin is used as a shell and a polymer having a glass transition temperature of −30° C. or lower is used as a core polymer and which is used as a reinforcing material, and a heat activation type hardener. According to the process, the composition is heated to 180° C., and adhesive strength between metals and between a metal and other materials can be remarkably increased. The composition can be used as a one component adhesive composition because the curing reaction does not take place unless the composition is heated to a high temperature, and the viscosity is stable at a room temperature.

This process can be applied as an excellent industrial process exhibiting a sufficient adhesive strength. However, this process is not suitable for household applications in which a heating facility to a high temperature is not available. Therefore, a process for adhesion which easily provides a sufficient adhesive strength, more specifically a tensile shear strength of 200 kgf/cm$^2$ or more and a T-peeling strength of 10 kgf/25 mm or more, without heating to a high temperature has been desired.

SUMMARY OF THE INVENTION

The present invention accordingly has an object to provide a process for adhesion using a semi-structural epoxy resin adhesive composition which can achieve strong adhesion between metals, woods, and plastics, as well as between these different materials, and can be conveniently used for household applications.

Extensive investigations undertaken by the present inventors with the object described above lead to a discovery that, when a mixture of an epoxy resin and a resin powder which is constituted with a core having a low glass transition temperature and a shell having a high glass transition temperature and ionically crosslinked by addition of a metal cation is mixed with an epoxy resin curing agent of a room temperature curing type to prepare an adhesive composition, the composition can be cured in a short time without heating at a high temperature and can achieve a high adhesive strength. The present invention has been completed on the basis of the discovery.

Thus, the present invention provides a process for adhesion using an epoxy resin adhesive composition which comprises coating surfaces for adhesion with a two component epoxy resin adhesive composition prepared immediately before the coating by mixing a mixture containing (A) resin powder prepared by ionic crosslinking of resin particles by addition of a metal cation and (B) an epoxy resin with (C) a curing agent of a room temperature curing type for epoxy resins, bringing the coated surfaces for adhesion into contact with each other, and subsequently heating the surfaces for adhesion, wherein the resin particle is constituted with (a) a core formed with a (meth)acrylate polymer and/or a diene polymer which has a glass transition temperature of −30° C. or lower and (b) a shell formed with a copolymer of a (meth)acrylate monomer and a radical polymerizable unsaturated carboxylic acid monomer having carboxyl group and 3 to 8 carbon atoms which has a glass transition temperature of 70° C. or higher.

The present invention also provides the process for adhesion using an epoxy resin adhesive composition described above, wherein the surfaces for adhesion are heated to 40° to 100° C. after the surfaces have been brought into contact with each other.

Other and further objects, features and advantages of the invention will appear more fully from the following description.

DETAILED DESCRIPTION OF THE INVENTION

In the process of the present invention, the resin particle of the core/shell copolymer used as component (A) is a core/shell copolymer which is constituted with a core formed with a polymer having a glass transition temperature of −30° C. or lower and a shell having a transition temperature of 70° C. or higher. In the preparation of the resin particles used as component (A), a rubbery seed polymer of component (a) constituting the core is prepared first. The rubbery seed polymer is composed of a polymer having a glass transition temperature of −30° C. or lower. Examples of the polymer having a glass transition temperature of −30° C. or lower include diene polymers and (meth)acrylate polymers. In the present invention, a (meth)acrylate means an acrylate or a methacrylate. Examples of the (meth)acrylate monomer providing a homopolymer having a glass transition temperature of −30° C. or lower include n-propyl acrylate (glass transition temperature of the homopolymer: −52° C.), n-butyl acrylate (glass transition temperature of the homopolymer: −54° C.), n-octyl acrylate (glass transition temperature of the homopolymer: −65° C.), 2-ethylhexyl acrylate (glass transition temperature of the homopolymer: −85° C.), n-decyl methacrylate (glass transition temperature of the homopolymer: −65° C.), and the like. The (meth)acrylate monomer may be used singly or as a combination of two or more kinds. Among these monomers, n-butyl acrylate and 2-ethylhexyl acrylate are preferable. Examples of the diene monomer providing a homopolymer having a glass transition temperature of −30° C. or lower include conjugated diene compounds, such as butadiene, isoprene, 1,3-pentadiene, cyclopentadiene, and the like; and non-conjugated diene compounds, such as 1,4-hexadiene and the like. The diene monomer may be used singly or as a combination of two or more types. Among these monomers, butadiene and isoprene are preferable.

In the present invention, the glass transition temperature of the core is preferably −30° C. or lower, more preferably −40° C. or lower. When the glass transition temperature of the core is higher than −30° C., the function of the resin powder of component (A) as a material to reinforce the epoxy resin of component (B) decreases, and impact resistance becomes inferior.

In the present invention, it is also effective that a core having an increased elasticity is prepared by optionally adding a crosslinking monomer to the (meth)acrylate monomer or the diene monomer described above. As the crosslinking monomer, a monomer having two or more double bonds of substantially the same reactivity can be used. Examples of the crosslinking monomer include ethylene glycol di(meth)acrylate, butylene glycol di(meth) acrylate, trimethylolpropane di(meth)acrylate, trimethylolpropane tri(meth)acrylate, hexanediol di(meth)acrylate, oligoethylene di(meth)acrylate, aromatic divinyl monomers such as divinylbenzene and the like, triallyl trimellitate, triallyl isocyanurate, and the like. The crosslinking monomer may be used singly or as a combination of two or more types as long as the glass transition temperature of the resultant polymer is −30° C. or lower. The amount of the crosslinking monomer is selected generally in the range of 0.01 to 5% by weight, preferably 0.1 to 2% by weight, based on the total weight of the monomers in the core. When the amount of the crosslinking monomer is more than 5% by weight of the total weight of the monomers in the core, the core is crosslinked excessively, and adhesive strength and impact resistance in particular of the epoxy resin composition decrease.

Other copolymerizable monomers may be used optionally in combination with the (meth)acrylate monomer, the diene monomer, and the crosslinking monomer described above. Examples of the other copolymerizable monomer used optionally include aromatic vinyl compounds, such as styrene, vinyltoluene, α-methylstyrene, and the like; cyanovinyl compounds, such as (meth)acrylonitrile, vinylidene cyanide, and the like; 2-hydroxyethyl (meth) acrylate; 3-hydroxybutyl acrylate; 2-hydroxyethyl fumarate; hydroxybutyl vinyl ether; monobutyl maleate; glycidyl methacrylate; butoxyethyl methacrylate; and the like. The other copolymerizable monomer may be used singly or as a combination of two or more compounds. It is necessary that the other copolymerizable monomer be used in such an amount that the glass transition temperature of the resultant polymer is −30° C. or lower. The amount is generally selected in the range of 50% by weight or less based on the total weight of the monomers in the core. A molecular weight modifier, such as t-dodecyl mercaptane or the like, may be added if necessary.

Next, the shell of component (b) having a glass transition temperature of 70° C. or higher is formed over the core of component (a) which is formed with the polymer having a glass transition temperature of −30° C. or lower as described above. In the formation of the shell, it is necessary that a monomer which provides a homopolymer having a glass transition temperature of 70° C. or higher be used as the main material for forming the shell. Examples of such monomer include (meth)acrylate monomers, such as isopropyl methacrylate (glass transition temperature of the homopolymer: 81° C.), t-butyl methacrylate (glass transition temperature of the homopolymer: 107° C.), cyclohexyl methacrylate (glass transition temperature of the homopolymer: 76° C.), phenyl methacrylate (glass transition temperature of the homopolymer: 110° C.), methyl methacrylate (glass transition temperature of the homopolymer: 105° C.), and the like; aromatic vinyl monomers, such as styrene (glass transition temperature of the homopolymer: 100° C.), 4-chlorostyrene (glass transition temperature of the homopolymer: 110° C.), 2-ethylstyrene (glass transition temperature of the homopolymer: 103° C.), and the like; acrylonitrile (glass transition temperature of the homopolymer: 125° C.); vinyl chloride (glass transition temperature of the homopolymer: 80° C.); and the like. The (meth)acrylate monomer described above may be used singly or as a combination of two or more kinds. Among these monomers, (meth)acrylate monomers are preferable, and methyl methacrylate is particularly preferable.

In the present invention, the glass transition temperature of the shell of component (b) is 70° C. or higher, preferably 90° C. or higher. When the glass transition temperature of the shell is lower than 70° C., resin particles of the copolymer having the core/shell structure tend to aggregate to form a block when the resin particles are dried after the polymerization reaction.

In the present invention, the ratio by weight of the core to the shell is in the range of 1/4 to 3/1, preferably in the range of 1/3 to 2/1. When the ratio by weight of the core to the shell is less than 1/4, there is the possibility that adhesive strength of the adhesive composition decreases. When the ratio by weight of the core to the shell is more than 3/1, there is the possibility that increase in viscosity of a mixture of ionically crosslinked resin particles containing the core/shell copolymer with an epoxy resin is enhanced during storage.

In the present invention, the resin in the shell is formed into a continuous material with the epoxy resin after the epoxy resin has been cured, and the adhesive strength can be kept at a high level. The resin in the shell is adjusted so that it is compatible with the epoxy resin. Therefore, the possibility arises that the liquid epoxy resin penetrates into the particles during storage before curing, and viscosity is increased so much that the coating operation cannot be made. The storage stability may be improved by treating the shell sufficiently with crosslinking by covalent bonding. However, this treatment leads to a contradictory result that the impact strength which is the original object of the adhesion is decreased. In the present invention, the increase in viscosity during storage is prevented and the cured product can be provided with a high impact strength, because the ionically crosslinked core/shell copolymer is used as the polymer forming the shell.

The crosslinked structure formed by the ionic crosslinking changes its nature reversibly with heat unlike crosslinked structures by covalent bonding, such as those by sulfur crosslinking and peroxide crosslinking. The surface of particles modified with the ionic crosslinking exhibits properties of a crosslinked structure at a room temperature, and under the condition of molding and curing by heating, the surface exhibits properties of a structure with relaxed crosslinking. As the result, the adhesive composition used in the present invention has the property simultaneously exhibiting both the stability of viscosity and the excellent adhesive property.

In the present invention, the metal cation as the crosslinking agent forms the ionic crosslinking between carboxyl groups incorporated as side chains in the shell of the core/shell copolymer. By the effect of the three dimensional polymer structure thus formed, the effect of the epoxy resin used as the dispersion medium to cause swelling is suppressed at room temperature. Under a heated condition, the epoxy resin is cured while it penetrates into the core/shell copolymer, and the proper physical properties of the adhesive composition can be exhibited.

In the present invention, a radical polymerizable unsaturated carboxylic acid monomer having a carboxyl group and 3 to 8 carbon atoms is used as a component in the material of the shell in order to enable the ionic crosslinking. Examples of the unsaturated carboxylic acid monomer include unsaturated monocarboxylic acids, such as (meth) acrylic acid, α-ethylacrylic acid, crotonic acid, and the like; unsaturated polycarboxylic acids, such as maleic acid, itaconic acid, fumaric acid, citraconic acid, chloromaleic acid, and the like; anhydrides of the unsaturated polycarboxylic acids; and derivatives of unsaturated polycarboxylic acids having at least one carboxyl group, such as monomethyl maleate, monoethyl maleate, monobutyl maleate, monomethyl fumarate, monoethyl fumarate, monomethyl itaconate, monoethyl itaconate, monobutyl itaconate, and the like. The unsaturated carboxylic acid monomer may be used singly or as a combination of two or more kinds. Among these monomers, (meth)acrylic acid, maleic acid, and maleic anhydride are preferable.

In the present invention, the copolymer forming the shell contains the unit of the radical polymerizable unsaturated carboxylic acid monomer in an amount of 0.01 to 20 parts by weight, preferably 0.05 to 10 parts by weight, more preferably 0.1 to 5 parts by weight, per 100 parts by weight of the copolymer. When the amount of the unit of the radical polymerizable unsaturated carboxylic acid monomer is less than 0.01 parts by weight per 100 parts by weight of the copolymer, the effect of modification of the surface of the particles by the ionic crosslinking is scarcely exhibited. When the amount of the unit of the radical polymerizable unsaturated carboxylic acid monomer is more than 20 parts by weight per 100 parts by weight of the copolymer, the effect of modification of the surface of the particles is not exhibited to the degree expected from the used amount, and the proper mechanical properties of the core/shell copolymer deteriorate.

In the present invention, a crosslinking monomer may be optionally added as another component of the material of the shell. As the crosslinking monomer, one or more kinds of the compounds can be selected from the compounds described in the examples of the (meth)acrylate polymer or the diene polymer forming the core. The crosslinking monomer is used generally in an amount of 0.01 to 10% by weight, preferably 0.1 to 5% by weight, based on the total weight of the monomers in the shell. When the amount of the crosslinking monomer is more than 10% by weight based on the total weight of the monomers in the shell, the function of the resin particles as a reinforcing material deteriorates.

In the present invention, other copolymerizable monomers may be used optionally in addition to the materials of the shell described above. As the copolymerizable monomer used optionally, one or more compounds can be selected from the compounds described in the examples of the (meth)acrylate polymer or the diene polymer forming the core. It is necessary that the copolymerizable monomer used optionally be used in such an amount that the glass transition temperature of the shell is 70° C. or higher. The amount is generally selected in the range of 50% by weight or less based on the total weight of the monomers in the shell.

In the present invention, for the preparation of the core/shell copolymer, a latex of the polymer particles is first prepared by using, for example, the monomers for forming the core described above according to the emulsion polymerization or the fine suspension polymerization. Then, the monomers for forming the shell described above are added to the resultant latex, and the polymerization is allowed to continue. For the reaction in the latter stage, the emulsion polymerization is generally adopted. In a process frequently used, a solution of an emulsifier and a solution of a radical initiator are added in small separate portions over a specified period in order to obtain a stable reaction product.

In the present invention, for the preparation of the ionically crosslinking core/shell copolymer, a specified amount of the radical polymerizable unsaturated carboxylic acid monomer described above is generally contained in the monomers for forming the shell used in the latter stage described above. The copolymer may contain carboxyl group throughout the whole shell, or only in the outermost layer of the shell. When the copolymer contains carboxyl group only in the outermost layer of the shell, the copolymer can be prepared according to a process in which a monomer having carboxyl group is added continuously or intermittently in a later stage of the polymerization reaction forming the shell, or a process in which a (meth)acrylate monomer is used as a component of the materials for forming the shell, and the resultant polymer particles are saponified by an alkali or the like after the polymerization is finished. It is preferred that carboxyl group is contained only in the outermost layer because the content of the monomer unit having carboxyl group in the overall core/shell copolymer particles can be kept low, and thereby the proper physical properties of the core/shell copolymer can be maintained. The core/shell copolymer can be prepared according to a multi-stage polymerization having at least two stages as described above. The core/shell copolymer may also be prepared by a process including partial aggregation of a seed latex prepared in the first stage by using an inorganic salt, an alcohol, or a monomer, and subsequent graft polymerization on the partially aggregated seed latex.

In the present invention, ionic crosslinking between the carboxyl groups in the shell is formed by adding a metal cation to the core/shell copolymer prepared above. As the metal cation, for example, a cation of a monovalent metal, such as potassium, sodium, lithium, cesium, or the like, or a divalent metal, such as calcium, zinc, tin, chromium, lead, or the like, can be used. A monovalent or divalent ion of a metal belonging to Group I or II of the Periodic Table is particularly preferable. Examples of the source of cation include oxides, hydroxides, salts of inorganic acids such as phosphoric acid, carbonic acid, nitric acid, sulfuric acid, hydrochloric acid, nitrous acid, sulfurous acid and the like, salts of organic acids, such as formic acid, acetic acid, propionic acid, butyric acid, octanoic acid, captic acid, palmitic acid, stearic acid, oleic acid, erucic acid, linolenic acid, succinic acid, adipic acid, naphthenic acid, thiocarboxylic acid, and the like, acetylacetone salts, and alcoholates such as methoxides and ethoxides, of the metals described above. When an acid salt of a metal is used, it is preferred that the acid has a dissociation constant $pK_a$ of 4 or more. Among the sources of metal cation described above, hydroxides and carboxylic acid salts of monovalent metals are particularly effective in view of reaction efficiency of the ionic crosslinking reaction and mechanical strength of heat molded articles. The sources of the monovalent and divalent metal cations described above are characteristic in that they can achieve the ionic crosslinking within several minutes at a room temperature.

In the present invention, the ionically crosslinked resin particles described above can be prepared by using the core/shell copolymer containing carboxyl group according to the following processes: (1) a process in which a cation is added to a latex of the core/shell copolymer after the polymerization process is finished; (2) a process in which the core/shell copolymer is dissolved in a suitable solvent, and a cation is added to the resultant polymer solution to allow the ionic crosslinking reaction to proceed; and (3) a process in which a cation is added to an intermediate mixture for preparation of an adhesive composition while a powder of the core/shell copolymer is added to an unreacted epoxy resin and the two components are mixed together. Any of these process may be used. Among these processes, process (1) in which a cation is added to a latex is easy and useful in view of easier handling and better efficiency of dispersion.

In the present invention, when the monomer containing carboxyl group is copolymerized in an aqueous reaction system, most of the carboxyl group is accumulated on the surface layer of the core/shell copolymer particles because of the hydrophilic property of the carboxyl group. Therefore, the probability that the cation dissociated in the aqueous phase encounters the carboxyl group having a high dissociating tendency is very high when the cation source is added to the aqueous phase. Thus, the ionic crosslinking reaction is completed in a short time because the reaction proceeds between the ionic species.

In the present invention, it is not necessary that the polymer forming the core is a copolymer containing units of a monomer containing carboxyl group. However, the polymer forming the core may be a copolymer containing units of a monomer containing carboxyl group as well.

In the present invention, the number of the crosslinkings can be easily adjusted by the amount of the added source of cation because, in the ionic crosslinking reaction described above, a part or the whole of the carboxyl groups are ionized to carboxyl anions, and ionic bonds are formed by taking the metal cations as counter cations. The reaction of ionic crosslinking described above generally proceeds quantitatively. However, the source of cation may be added in an amount larger than the theoretical amount. The ionic crosslinking can be easily analyzed by the measurement of absorption of the carboxylate group in an infrared spectrum, by the quantitative analysis of the metal ion, or by the measurement of degree of swelling of the core/shell copolymer in a solvent. The dissociation property of the ionic crosslinking can be analyzed by the differential thermal analysis. The density of the crosslinking can be obtained by the measurement of swelling.

In the present invention, it is necessary that the ratio by mol of the metal atom in the source of cation to the carboxyl group contained in the core/shell copolymer be selected in accordance with the desired degree of crosslinking when the core/shell copolymer is ionically crosslinked. It is preferred that the ratio by tool of the metal atom in the source of cation to the carboxyl group contained in the core/shell copolymer is in the range of 0.1 to 3. The ionically crosslinked resin particles exhibit particularly excellent mechanical properties when the ratio by tool is in this range. When the ratio by mol is less than 0.1, the effect of the surface modification on improvement of storage stability of the mixture of a copolymer resin powder and an epoxy resin is significantly inferior. When the amount is more than 3, there is the tendency that the resultant ionically crosslinked resin powder is hygroscopic, and the cured adhesive composition has inferior mechanical properties.

In the present invention, the core/shell copolymer of a powder form can be obtained by spray drying the latex containing the core/shell copolymer obtained from the multi-stage polymerization. The spray drying is conducted generally by using a multi-blade rotating disk, a rotating disk, or a spray nozzle. In the drying process, the core/shell copolymer generally forms separate aggregates in each sprayed droplet, and aggregated particles of about 20 to 100 μm diameter are formed. The degree of aggregation is different depending on the condition of the drying. A process of pulverization may be inserted after the drying process for separating aggregated particles. When latex particles obtained after the emulsion polymerization are separated from the reaction medium by coagulation by salting out or freezing, and the coagulated particles are dewatered to prepare a wet cake, the core/shell copolymer can also be obtained in the form of aggregated particles by drying the resultant wet cake with a fluidized bed or the like.

The epoxy resin of component (B) used in the present invention is an epoxy resin which is in the liquid form or a past form at an ordinary temperature. Examples of the epoxy resin include various types of epoxy resins, such as bisphenol condensates, hydantoin epoxy resins, novolak-type epoxy resins, aliphatic epoxy resins, epoxy resins modified with dimer acids, epoxy resins modified with NBR, epoxy resins modified with urethanes, and the like. Particularly preferable examples of the epoxy resin include initial condensates obtained by the reaction of bisphenol A or bisphenol F with compounds containing epoxy group such as epichlorohydrin. Epoxy resins derived from compounds obtained by addition of 2 to 20 mol of ethylene oxide or propylene oxide to bisphenol A may be used as well.

The amount of the resin powder of component (A) used in the present invention is 5 to 70 parts by weight, preferably 10 to 50 parts by weight, based on 100 parts by weight of the epoxy resin of component (B). When the amount of the resin powder is less than 5 parts by weight based on 100 parts by weight of the epoxy resin, the resultant adhesive composition has an inferior adhesive strength. When the amount of the resin powder is more than 70 parts by weight based on 100 parts by weight of the epoxy resin, the resultant adhesive composition has an excessively high viscosity, and the adhesive strength is not enhanced to the degree expected from the amount used.

The resin powder of component (A) and the epoxy resin of component (B) can be mixed together by using a conventional mixing apparatus. As such mixing apparatus, a disper, a kneader, a three-roll mill, a paddle mixer, a planetary mixer, or the like, can be advantageously used. Because the resin powder used in the present invention has been ionically crosslinked in the shell, the resin powder can be stored with stability even after being mixed with an epoxy resin unless the mixture is heated to a high temperature.

Examples of the curing agent of a room temperature curing type for epoxy resins of component (C) used in the present invention include aliphatic amine compounds, such as ethylenediamine, diethylenetriamine, triethylenetetramine, tetraethylenepentamine, hexamethylenediamine, bis(aminomethyl)cylclohexane, N-aminoethylpiperazine, 3,9-bis(3-aminopropyl)-2,4,8,10-tetraoxaspiro(5,5)undecane, m-xylenediamine, polyamideamines derived from various dimer acids and aliamines, and the like. The curing agent may be used singly or as a combination of two or more types. These curing agents are compounds generally used for curing reaction of epoxy resins at an ordinary temperature (15° to 40° C.).

When the process for adhesion of the present invention is conducted, a mixture of the resin powder described above and the epoxy resin is mixed with the curing agent of a room temperature curing type for epoxy resins immediately before the operations for the adhesion. The mixture of the resin powder and the epoxy resin can be mixed with the curing agent according to any suitable process. For example, when a large amount of the mixture is mixed with the curing agent, a mixing machine, such as a disper, a kneader, a three-roll mill, a paddle mixer, a planetary mixer, or the like, can be used. When the surface area for adhesion is relative small, a small amount of the mixture and the curing agent can be mixed together by an operation with hands. When a dyestuff is mixed with the mixture of the resin powder and the epoxy resin or with the curing agent and an agent for eliminating the color of the dyestuff is mixed with the other component in advance, the degree of mixing of the mixture and the curing agent can be found by observing the degree of elimination of the color. After the mixture of the resin powder and the epoxy resin has been mixed with the curing agent, the resultant composition is applied to the surfaces for adhesion to form thin layers, and the articles for adhesion are then put together at the surfaces for the adhesion and heated. The temperature of heating is preferably 40° to 100° C., more preferably 50° to 80° C.

The adhesive effect can be exhibited at room temperature because curing agent of a room temperature curing type is mixed with the epoxy resin adhesive composition used in the present invention. However, it has been found that a surprisingly high adhesive strength can be achieved by heating.

The method of heating is not particularly limited. Various methods, such as blowing hot air from a hair drier, irradiation of infrared ray using an infrared lamp, heating in an oven, or the like, can be advantageously used. For adhesion between metals, the adhesion can also be completed by pouring hot water over the metals. When the temperature of heating is lower than 40° C., the curing requires 24 hours or more, and the process is not practical. When the temperature of heating is higher than 100° C., there is the possibility that adhesive strength is decreased.

According to the process of the present invention, adhesion with a high strength can be achieved even when a large scale heating facility to a high temperature is not available, such as the case in household applications. The adhesive composition used in the present invention contains, as the reinforcing material, a resin powder which has a core formed with a flexible polymer compatible with an epoxy resin and is coated at the outer surface thereof with a shell ionically crosslinked with a metal salt of a carboxylic acid to prevent penetration of the epoxy resin at an ordinary temperature. A curing agent of a room temperature curing type is mixed with an epoxy resin containing the resin powder immediately before the operation for adhesion, and the resultant adhesive composition is applied to the surfaces for adhesion. The surfaces for adhesion are brought into contact with each other and heated to a moderate temperature in the range of 40° to 100° C. By the procedures described above, a structural adhesive strength sufficient for buildings, furnitures, vehicles, and the like, can be achieved even for household applications.

To summarize the advantages obtained by the invention, the two component epoxy resin adhesive composition used in the present invention comprises a core/shell copolymer, and a high tensile shear strength and T-peeling strength can be achieved even when the composition is cured at a moderate temperature like 40° to 100° C.

EXAMPLES

The invention will be understood more readily with reference to the following examples; however, these examples are intended to illustrate the invention and are not to be construed to limit the scope of the invention.

Preparation Example of a Reinforcing Material

A polymerization reactor was charged with a monomer shown in the core of Table 1 in an amount also shown in Table 1, 150 parts by weight of water, 1.0 parts by weight of a sodium alkylsulfate having 12 to 18 carbon atoms, 0.3 parts by weight of t-dodecyl mercaptan, and 0.1 parts by weight of potassium persulfate, and emulsion polymerization was allowed to proceed at 70° C. When the conversion of the polymerization reached 98%, the polymerization was temporarily stopped by cooling. Then, methyl methacrylate alone among the monomers shown in the shell of Table 1 was added in an amount also shown in Table 1. The polymerization was allowed to continue at 70° C. When the conversion of methyl methacrylate added in the above reached 50%, methacrylic acid shown in the shell of Table 1 was added continuously over the time of 3 hours. The reaction was allowed to continue, and when the overall conversion of polymerization reached 96%, the reaction system was cooled to finish the polymerization reaction.

To the latex obtained after the polymerization, 100 parts by weight of a 1% by weight aqueous solution of potassium hydroxide was added at a room temperature, and the mixture was kept stirring for 30 minutes. Then, the resultant latex was dried by a spray drying apparatus with a hot air stream of 150 ° C., and ionically crosslinked resin powders (i) and (ii) were obtained.

TABLE 1

| ionically crosslinked resin particles | (i) | (ii) |
|---|---|---|
| core | | |
| monomer (part by weight) | | |
| n-butyl acrylate | 39.3 | — |
| butadiene | — | 39.3 |
| divinylbenzene | 0.7 | 0.7 |
| glass transition temperature (°C.) | −45 | −70 |
| shell | | |
| monomer (part by weight) | | |
| methyl methacrylate | 58 | 58 |
| methacrylic acid | 2 | 2 |
| glass transition temperature (°C.) | 105 | 105 |
| potassium hydroxide (part by weight) | 1 | 1 |
| number-average diameter of a single particle (μm) | 0.3 | 0.2 |

Measurement of adhesive strength (1) Tensile shear strength: Tensile shear strength was measured according to the method of Japanese Industrial Standard K 6850 at a pulling speed of 5 mm/min at 23° C. by using a test piece which was prepared by adhesion of steel plates of 1.6 mm thickness with an adhesion area of 25 mm×10 mm. The measurement was conducted using five test pieces, and the average value of the five measurements was obtained.

(2) T-peeling strength: T-peeling strength was measured according to the method of Japanese Industrial Standard K 6854 at a pulling speed of 50 mm/min at 23° C. by using a test piece which was prepared by adhesion of steel plates of 0.8 mm thickness with an adhesion area of 150 mm×25 mm. The measurement was conducted using five test pieces, and the average value of the five measurements was obtained.

The test pieces used in the above measurements were heated under the conditions shown in Table 2 and transferred to a room kept at 23° C. immediately after the heating. The measurements were conducted 1 hour after the transfer of the test pieces to the room.

Examples 1 to 5 and Comparative Examples 1 to 10

The surface for adhesion of a SPCC steel plate in accordance with Japanese Industrial Standard G 3141 was polished with a #240 polishing paper until metallic gloss appeared, cleaned thoroughly with trichloroethylene, and dried.

Components of an adhesive composition were mixed according to the formulation shown in Table 2 in a 500 ml polyethylene cup. The mixture was applied to the surfaces of the steel plates, and the coated surfaces were brought into contact with each other. The combined plates were immediately heated under the heating condition shown in Table 2 for curing.

TABLE 2

(Part 1)

| Example | 1 | 2 | 3 | 4 | 5 | — | — | — |
|---|---|---|---|---|---|---|---|---|
| Comparative Example | — | — | — | — | — | 1 | 2 | 3 |
| ²formulation of a composition (part by weight) | | | | | | | | |
| Epikote 828 | 100 | 100 | 100 | 100 | 100 | 100 | 100 | 100 |
| Adeka Resin EPU-11 | — | — | — | — | — | — | — | — |
| Good Mide G-730 | 80 | 80 | 80 | 80 | 80 | 80 | 80 | 80 |
| Epomate B001 | — | — | — | — | — | — | — | — |
| dicyandiamide | — | — | — | — | — | — | — | — |
| DCMU | — | — | — | — | — | — | — | — |
| reinforcing material | | | | | | | | |
| type | (i) | (i) | (ii) | (i) | (i) | — | — | — |
| amount | 30 | 30 | 30 | 30 | 30 | — | — | — |
| Hakuenka U | — | — | — | — | 40 | — | — | — |
| condition of heating | | | | | | | | |
| 30° C. × 168 hours | — | — | — | — | — | O | — | — |
| 30° C. × 24 hours | — | — | — | O | — | — | — | — |
| 50° C. × 24 hours | O | — | — | — | — | — | — | — |
| 60° C. × 30 minutes | — | — | — | O | — | — | — | — |
| 60° C. × 1 hour | — | O | — | — | O | — | O | — |
| 80° C. × 1 hour | — | — | O | — | — | — | — | O |
| 110° C. × 30 minutes | — | — | — | — | — | — | — | — |
| 130° C. × 30 minutes | — | — | — | — | — | — | — | — |
| 150° C. × 30 minutes | — | — | — | — | — | — | — | — |
| tensile shear strength (kgf/cm²) | 270 | 270 | 290 | 290 | 250 | 140 | 170 | 190 |
| T-peeling strength (kgf/25 mm) | 10 | 13 | 10 | 12 | 12 | <1 | <1 | <1 |

| Example | — | — | — | — | — | — | — |
|---|---|---|---|---|---|---|---|
| Comparative Example | 4 | 5 | 6 | 7 | 8 | 9 | 10 |
| ²formulation of a composition (part by weight) | | | | | | | |
| Epikote 828 | 100 | 100 | 100 | 100 | 100 | — | — |
| Adeka Resin EPU-11 | — | — | — | — | — | 100 | 100 |
| Good Mide G-730 | 80 | 80 | — | — | — | — | — |
| Epomate B001 | — | — | — | — | — | 40 | 40 |
| dicyandiamide | — | — | 8 | 8 | 8 | — | — |
| DCMU | — | — | 2 | 2 | 2 | — | — |
| reinforcing material | | | | | | | |
| type | (i) | (i) | (i) | (i) | (i) | — | — |
| amount | 30 | 30 | 30 | 30 | 30 | — | — |
| Hakuenka U | — | — | — | — | — | 40 | 40 |
| condition of heating | | | | | | | |
| 30' C. × 168 hours | O | — | — | — | — | O | — |
| 30° C. × 24 hours | — | — | — | — | — | — | — |
| 50° C. × 24 hours | — | — | — | — | — | — | — |
| 60° C. × 30 minutes | — | — | — | — | — | — | — |
| 60° C. × 1 hour | — | — | — | — | — | — | — |

TABLE 2-continued

|  | | | | | | | |
|---|---|---|---|---|---|---|---|
| 80° C. × 1 hour | — | — | — | — | — | — | ○ |
| 110° C. × 30 minutes | — | ○ | ○ | — | — | — | — |
| 130° C. × 30 minutes | — | — | — | ○ | — | — | — |
| 150° C. × 30 minutes | — | — | — | — | ○ | — | — |
| tensile shear strength (kgf/cm²) | 270 | 290 | <10 | 190 | 220 | 110 | 120 |
| T-peeling strength (kgf/25 mm) | 5 | 4 | 0 | 4 | 11 | 5 | 4 |

Notes to Table 2
1) The mark ○ shows that the marked condition of heating was used in the example or the comparative example.
²Materials used in the formulation of a composition are as following:
Epikote 828: an epoxy resin of a bisphenol A type, a product of Yuka Shell Epoxy Co, Ltd.
Adeka Resin EPU-11: an epoxy resin modified with urethane, a product of Asahi Denka Kogyo Co., Ltd.
Good Mide G-730: a polyamideamine curing agent of a room temperature curing type, a product of Toto Kasei Co., Ltd.
Epomate B001: a heterocyclic etherdiamine curing agent of a room temperature curing type, a product of Yuka Shell Epoxy Co., Ltd.
dicyandiamide: a curing agent of a heating type, a product of Nippon Carbide Co., Ltd.
DCMU: a curing accelerator, a product of Hodogaya Kagaku Kogyo Co., Ltd., 3-(3,4-dichlorophenyl)-1,1-dimethylurea.
Hakuenka U: a calcium carbonate filler, a product of Shiraishi Calcium Co., Ltd.

In Comparative Examples 1, 2 and 3, 80 parts by weight of a curing agent of a room temperature curing type alone was mixed with 100 parts by weight of an epoxy resin of a bisphenol A type, and the mixture was cured under the condition of 30° C.×1 week, 60° C.×1 hour, and 80° C.×1 hour, respectively. In all cases, the obtained tensile shear strength did not reach the range which is practical for a structural adhesive composition, and the T-peeling strength showed extremely low values.

In contrast, in Examples 1 and 2, 30 parts by weight of reinforcing material (i) was added to the formulation of Comparative Examples 1 and 2. In Example 3, 30 parts by weight of reinforcing material (ii) was added to the formulation of Comparative Example 3. The curing was conducted under 50° C.×24 hours in Example 1, under 60° C.×1 hour in Example 2, and under 80×1 hour in Example 3. The curing conditions in Examples 2 and 3 were the same as those in Comparative Examples 2 and 3, respectively. The results in Examples 1 to 3 showed tensile shear strengths higher than those in Comparative Examples 1 to 3 by 50% or more and T-peeling strengths 10 times or more as high as those in Comparative Examples 1 to 3. Thus, the results in Examples 1 to 3 showed values reaching the level which can be used as a semi-structural adhesive composition.

In Example 4, the composition of the same formulation as that in Example 1 was used, and the test pieces which had been brought into contact with each other were kept at 30° C. for 1 day and then heated at 60° C. for 30 minutes. It is shown that the T-peeling strength could be enhanced by the heating after the test piece had been kept for some time.

In Example 5, 40 parts by weight of fine calcium carbonate was used in addition to the formulation used in Example 2, and the test piece was heated under the same condition as that in Example 2. Even though viscosity of the adhesive composition was increased by addition of the filler in order to prevent down flow of the adhesive composition, the tensile shear strength and the T-peeling strength showed almost no decrease.

In Comparative Example 4, the composition prepared according to the same formulation as those in Examples 1, 2 and 4 was used, and the test pieces were cured at 30° C. for 1 week. The T-peeling strength was less than a half of those in Examples 1, 2, and 4 in which the test pieces were heated. This result shows that a reinforcing material cannot exhibit the effect sufficiently without heating even when the reinforcing material is contained in the composition.

In Comparative Example 5, the composition prepared according to the same formulation as those in Examples 1, 2, and 4 was used, and the test pieces were cured by heating at 110° C. for 30 minutes. The T-peeling strength was less than a half of those in Examples 1, 2, and 4. This result shows that an excessively high heating temperature causes decrease in the T-peeling strength.

Comparative Example 6, 7, and 8 are typical examples in which dicyandiamide and a curing accelerator were used, and the adhesive composition was cured by heating. In order to obtain a sufficient adhesive strength, heating to a temperature of 150° C. or higher was necessary. Thus, a special facility for the heating is required to achieve adhesion. Furthermore, materials having a lower softening point, such as various types of thermoplastics, cannot be used as substrates for the adhesion.

In Comparative Examples 9 and 10, typical formulations using conventional epoxy resins modified with urethane were employed. This type of formulation is considered to provide a room temperature curing composition which exhibits a high T-peeling strength. However, the results show that the tensile shear strength was low and did not reach a level which is satisfactory as a semi-structural adhesive material. Furthermore, this composition did not show any improvement in physical properties by heating.

What is claimed is:

1. A process for adhesion using an epoxy resin adhesive composition which comprises coating at least one surface for adhesion with a two component epoxy resin adhesive composition prepared immediately before the coating by mixing a mixture containing (A) resin powder prepared by ionic crosslinking of resin particles by addition of a metal cation and (B) an epoxy resin with (C) a room temperature curable curing agent for epoxy resins, bringing the coated surface for adhesion into contact with at least one other surface, and subsequently heating the surfaces to 40° to 100° C. for adhesion, wherein the resin particles comprise:

(a) a core formed with a (meth)acrylate polymer or a diene polymer which has a glass transition temperature of −30° C. or lower and (b) a shell formed with a copolymer of a (meth)acrylate monomer and a radical polymerizable unsaturated carboxylic acid monomer having at least one carboxyl group and 3 to 8 carbon atoms which has a glass transition temperature of 70° C. or higher.

2. A process for adhesion using an epoxy resin adhesive composition according to claim 1, wherein the core is formed with a polymer of n-butyl acrylate or 2-ethylhexyl acrylate, optionally containing 0.01 to 5% by weight of units of a crosslinking monomer and/or 50% by weight or less of units of other monomers copolymerizable with these monomers.

3. A process for adhesion using an epoxy resin adhesive composition according to claim 1, wherein the core is formed with a polymer of butadiene or isoprene, optionally containing 0.01 to 5% by weight of units of a crosslinking monomer and/or 50% by weight or less of units of other monomers copolymerizable with these monomers.

4. A process for adhesion using an epoxy resin adhesive composition according to claim 1, wherein the shell is formed with a copolymer of methyl methacrylate and a radical polymerizable unsaturated carboxylic acid monomer having at least one carboxyl group and 3 to 8 carbon atoms.

5. A process for adhesion using an epoxy resin adhesive composition according to claim 1, wherein the copolymer forming the shell contains 0.01 to 20 parts by weight of units of the radical polymerizable unsaturated carboxylic acid monomer per 100 parts by weight of the copolymer.

6. A process for adhesion using an epoxy resin adhesive composition according to claim 1, wherein the copolymer forming the shell contains 0.05 to 10 parts by weight of units of the radical polymerizable unsaturated carboxylic acid monomer per 100 parts by weight of the copolymer.

7. A process for adhesion using an epoxy resin adhesive composition according to claim 1, wherein the copolymer forming the shell contains 0.1 to 5 parts by weight of units of the radical polymerizable unsaturated carboxylic acid monomer per 100 parts by weight of the copolymer.

8. A process for adhesion using an epoxy resin adhesive composition according to claim 1, wherein the ratio by weight of the core to the shell is 1/4 to 3/1.

9. A process for adhesion using an epoxy resin adhesive composition according to claim 1, wherein the metal cation is an ion of a metal belonging to Group I or II of the Periodic Table.

10. A process for adhesion using an epoxy resin adhesive composition according to claim 1, wherein the mixture contains the resin powder of component (A) in an amount of 5 to 70 parts by weight per 100 parts by weight of the epoxy resin of component (B).

11. The process of claim 1, wherein the room temperature curable curing agent is an aliphatic amine compound, bis(aminomethyl)cyclohexane, N-aminoethylpiperazine, 3,9-bis(3-aminopropyl)-2,4,8,10-tetraoxaspiro(5,5)undecane, m-xylenediamine, a polyamideamine derived from dimer acids and diamines or a mixture thereof.

12. The process of claim 1, wherein the room temperature curable curing agent is ethylenediamine, diethylenetriamine, triethylenetetramine, tetraethylpentamine, hexamethylenediamine, bis(aminomethyl)cyclohexane, N-aminoethylpiperazine, 3,9-bis(3-aminopropyl)-2,4,8,10-tetraoxaspiro(5,5)undecane, m-xylenediamine, a polyamideamine containing adducts of dimer acids and diamines or a mixture thereof.

13. The process of claim 1, wherein the room temperature curable curing agent is an aliphatic amine compound or a polyamideamine containing adducts of dimer acids and diamines.

* * * * *